United States Patent [19]

Eda et al.

[11] 4,336,315
[45] Jun. 22, 1982

[54] ORGANIC ELECTROLYTE CELL WITH MANGANESE DIOXIDE CATHODE AND A LIGHT METAL ANODE

[75] Inventors: Nobuo Eda; Takashi Iijima, both of Hirakata; Yoshinori Toyoguchi, Osaka, all of Japan

[73] Assignee: Matsushita Electric Industrial Co., Ltd., Japan

[21] Appl. No.: 227,785

[22] Filed: Jan. 21, 1981

[30] Foreign Application Priority Data

Jan. 21, 1980 [JP] Japan .................................. 55-6208

[51] Int. Cl.³ ............................................ H01M 6/16
[52] U.S. Cl. .................................. 429/194; 429/197; 429/224
[58] Field of Search ............... 429/194, 197, 198, 224, 429/57, 218

[56] References Cited

U.S. PATENT DOCUMENTS

| | | | |
|---|---|---|---|
| 4,133,856 | 1/1979 | Ikeda et al. | 429/224 X |
| 4,197,366 | 4/1980 | Tamura et al. | 429/197 |
| 4,264,689 | 4/1981 | Moses | 429/224 X |
| 4,279,972 | 7/1981 | Moses | 429/194 X |

Primary Examiner—Anthony Skapars
Attorney, Agent, or Firm—Wenderoth, Lind & Ponack

[57] ABSTRACT

A cell composed of an anode with a light metal as an active material, a cathode with manganese dioxide as an active material, and an organic electrolyte. The cathode contains an alkaline earth metal oxide. The cell is superior in storage with the swelling of the cell and the increase of the cell impedance is little during the preservation.

6 Claims, 4 Drawing Figures

ORGANIC ELECTROLYTE CELL WITH MANGANESE DIOXIDE CATHODE AND A LIGHT METAL ANODE

The present invention relates to improvements in preservation characteristics of a cell, which uses an anode with a light metal, represented by lithium, as an active material, an organic electrolyte, and a cathode with manganese dioxide as an active material.

In recent years, portable electronic appliances are becoming smaller in size and longer in life service, and the cell as the power source for the appliances is desired to be smaller in size and lighter in weight, i.e., higher in energy density. An organic electrolyte cell is worth notice as a cell to cope with the requirement, and a manganese dioxide-lithium cell is one of the desired cells.

The manganese dioxide used for this type of conventional cells is desired to be $\gamma$ phase in crystal structure in terms of the value of voltage. However, since the this type of manganese dioxide contains moisture, it is not suitable for the lithium cell which is non-aqueous in the system. On the other hand, although the $\beta$ phase of the manganese dioxide is superior in storage, the voltage becomes lower due to the lower electrochemical activity thereof. Hydrated electrolytic manganese dioxide is normally dehydrated through the thermal treatment in air at the temperature of 300° through 450° C., and the manganese dioxide of $\gamma.\beta \sim \beta$ phase in crystal structure is ordinarily used in the conventional lithium cells.

When the above-described thermally-treated manganese dioxide, together with a conductive material such as carbon black or the like or binder such as fluorine resin or the like, constitutes a cathode, the cathode is put into a cell, and the cell is aged with providing of the preservation at the temperature of 60° C. for three days, gas is produced within the cell to increase the cell height considerably or to increase the impedance of the cell, thus deteriorating the characteristics of the cell. And when the cell is stored furthermore at the temperature of 60° C., the growth of the cell height, i.e., the cell swelling is reduced from the three days' preservation at the temperature of 60° C., and after thirty days' preservation, the cell is almost restored to the height provided immediately after the manufacturing operation, while the cell impedance goes on increasing, whereby the performance is clearly deteriorated.

The present inventors have examined the above-described phenomena of the cell concerning the deterioration, to find out the following.

Generally, in the lithium-manganese dioxide cell, low boiling-point ether or the like is mixed with propylene carbonate as a main component, in which a proper amount of lithium perchlorate is generally dissolved as the electrolyte. Among them, the propylene carbonate is ester, which is likely to be decomposed by a very small amount of acid or the like, whereby gas is produced. This tendency of the decomposition is particularly remarkable at high temperatures. It is known that the manganese dioxide has an ion-exchange function and dissociates proton in the water solution to increase the acidity of the liquid. Although the manganese dioxide used for the lithium cell is thermally treated at a high temperature and is dehydrated, it still has chemically adsorbed surface hydroxyl group on the surface thereof. Accordingly, the manganese dioxide has acid catalysis in view of this point. Also, the several tens through several hundreds of ppm moisture unavoidably penetrates and leaches into the electrolyte, which has been poured into the cell, from the atmosphere during the manufacturing of the cell or from the moisture adsorbed onto the cathode compound components.

The manganese dioxide comes into contact with these moisture during the preservation and dissociates the proton from the surface hydroxyl group provided on the manganese dioxide to provide acidity, and, thus, propylene carbonate is decomposed, resulting in a cause for producing the gas. Also, the surface hydroxyl group results in a cause for oxidation-decomposing and deteriorating, within the cell, in cooperation with the electrochemical catalysis which the material quality of the current collector may have.

According to the description of the present inventors, it is found out that alkaline earth metal oxide as solid base is mixed with the manganese dioxide to neutralize and inactivate the solid acidity, which is based on the surface hydroxyl group of the manganese dioxide, and the open-circuit voltage becomes lower than before when the cathode of the cell is made of this manganese dioxide. The conventional disadvantages of causing the gas to provide the cell swelling or to increase the cell impedance considerably are removed even if the cell is preserved at the temperature of 60° C. as before, since the open-circuit voltage becomes so lower than before that the potential cannot cause the anodic decomposition within the cell.

The present invention was accomplished for the purpose of eliminating the above discussed problems encountered in conjunction with the prior art cell.

Therefore, an object of the present invention is to provide a cell, wherein the manganese dioxide, as an active cathode material, with the alkaline earth metal oxide being added thereto and mixed therewith in advance is used to control the increase of the cell height, i.e., the large cell swelling, and the increase of the cell impedance during the preservation.

The object and other objects, features, aspects and advantages of the present invention will become more apparent from the following detailed description of the present invention when taken in conjunction with the accompanying drawings in which.

Figure 1:
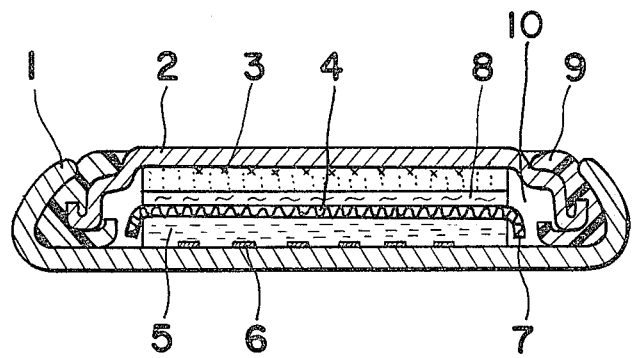
FIG. 1 is a cross-sectional view of a cell according to one embodiment of the present invention.

Referring now to the drawings, there is shown in FIG. 1 a lithium cell of flat type according to one embodiment of the present invention. The cell has a two-part container or housing including a positive electrode member or case 1 made, for example, of stainless steel and serving as a positive terminal, and a negative electrode member or sealing plate 2 made, for example, of stainless steel and serving as a negative electrode. Grids 3 are provided with welding on the inner face of the sealing plate 2, while a current collector 6 is welded to the inner face of the case 1. An anode 4 made of a light metal such as lithium is housed as an active material in the sealing plate 2 and is adhered under pressure to the grid 3. A cathode 5 made of manganese dioxide including alkaline earth metal oxide, wherein a given amount of compound is molded and dried into a disc shape, is housed as an active material in the case 1 and is provided on the current collector 6. Between the anode 4 and cathode 5 there are provided a separator 7 composed of a laminated layer of non-woven close of polypropylene, for which resistance against oxidation and alkali is required, and a liquid retaining material 8 composed of non-woven close of polypropylene, although the liquid retaining material 8 may be dispensed with where possible. Into the room provided within the case 1 and sealing plate 2 a given amount of organic electrolyte 10 including ester is poured and filled, wherein lithium perchlorate is dissolved to the concentration of 1 mol/l in the mixed solvent of propylene carbonate and 1,2-dimethoxyethane in equal volume. Within the gap disposed between the case 1 and sealing plate 2, there is provided an annular insulating gasket 9 made, for example, of polypropylene to seal the gap. Accordingly, the cell is composed of an anode 4 with a light metal connected to the negative electrode of the sealing plate 2, a cathode 5 with manganese dioxide including alkaline earth metal oxide and connected to the positive electrode of the case 1, and an organic electrolyte 10 with ester disposed between the anode 4 and cathode 5. It is to be noted here that the alkaline earth metal oxide being included in the manganese dioxide of the cathode is selected from a group composed of magnesium oxide, the addition amount of which is preferably 1 through 5 mol % with respect to dehydrated manganese dioxide, calcium oxide, the addition amount of which is preferably 1 through 3 mol % with respect to dehydrated manganese dioxide, strontium oxide, the addition amount of which is preferably 1 through 3 mol % with respect to the dehydrated manganese dioxide, and barium oxide, the addition amount of which is preferably 0.5 through 3 mol % with respect to the dehydrated manganese dioxide, as mentioned hereinbelow in conjunction with FIGS. 2 to 4.

Magnesium oxide, calcium oxide, strontium oxide and barium oxide are selected as the alkaline earth metal oxide, which are solid base to be added to and mixed with the manganese dioxide. Each of them similarly dislikes the moisture, but reacts to the moisture, as the lithium dislikes it. The normal electrolytic manganese dioxide is employed to use for a material as the manganese dioxide. Since the electrolytic manganese dioxide is γ in phase and normally contains the moisture of 5 through 6% by weight, the normal electrolytic manganese dioxide is thermally treated to dehydrate in advance for use within the dry air at the temperature of 400° C. for 8 hours and, then, is gradually cooled away from the open air. The oxide is added, under the dry air, respectively by 0.5 through 5.0 mol % to the thermally treated manganese dioxide and is sufficiently mixed therewith before being used. In addition, the same electrolytic manganese dioxide is prepared to thermally treat under the same conditions and no oxide is added thereto to obtain a sample for comparison. Also, acetylene black 3 parts by weight and fluorine resin binder 5 parts by weight are mixed to the manganese dioxide with the oxide being added, 100 parts by weight, or the manganese dioxide without any oxide being added 100 parts by weight, thereby to provide the active cathode materials to be applied to the cell of the present invention or the cell of a comparison sample.

With employment of the active cathode materials cells each of 20 mm in maximum outside-diameter and of 1.6 mm in maximum height as shown in FIG. 1 have been manufactured, after the drying operation under the reduced pressure of 30 mm Hg at 80° C. Such a cell is tested to clarify the properties thereof and the results are obtained as shown within FIGS. 2 to 4.

Figure 2:
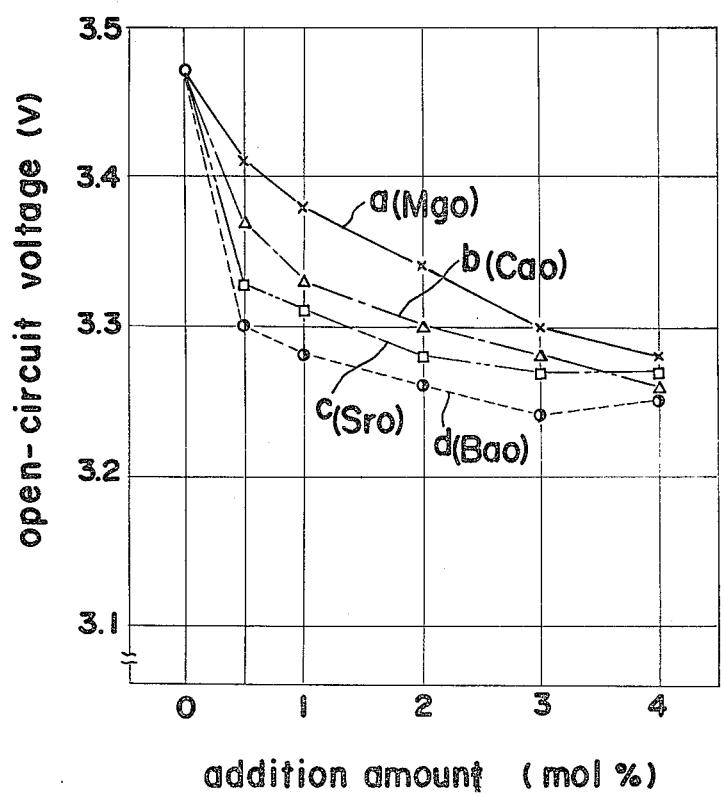
FIG. 2 is a graph showing relationships between the open-circuit voltage of the cell and the addition amount of the various oxides with respect to the manganese dioxide to be deposited within the cell.

FIG. 2 shows the relationship between an open-circuit voltage immediately after the manufacturing operation of the cell and the addition amount of an oxide with respect to manganese dioxide of the cathode to be disposed in the cell. In FIG. 2, the reference characters a through d in the graph show addition results of examples each adding magnesium oxide, calcium oxide, strontium oxide and barium oxide respectively, and the point O corresponding to the addition amount of zero in the graph shows the non-addition result of a comparison example in which no amount of oxide is added.

Figure 3:
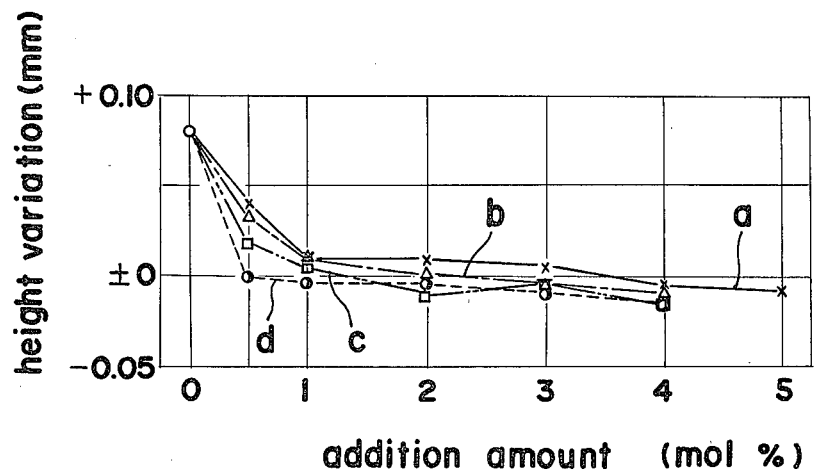
FIG. 3 is a graph showing relationships between the addition amount of the oxides to be deposited within the cell and the value for indicating the swelling of the cell.

FIG. 3 shows the relationship between the addition amount of an oxide with respect to manganese dioxide of the cathode to be disposed in the cell and the comparison rate of the varied height of the cell being changed in response to the swelling after three days' preservation at the temperature of 60° C. against the initial height thereof being measured immediately after the manufacturing operation. Also, in FIG. 3 the reference characters a through d and point O are the same as those in FIG. 2, respectively. In fact, it is well known that this type of cell as shown in FIG. 1 has a property of which the amount of height variation, i.e. the swelling of the cell is largest at the state after the cell was disposed to preserve at the temperature of 60° C. for three days, so that the condition for obtaining the results in FIG. 3 is selected so as to set up, the three days preservation at 60° C. to the cell.

Figure 4:
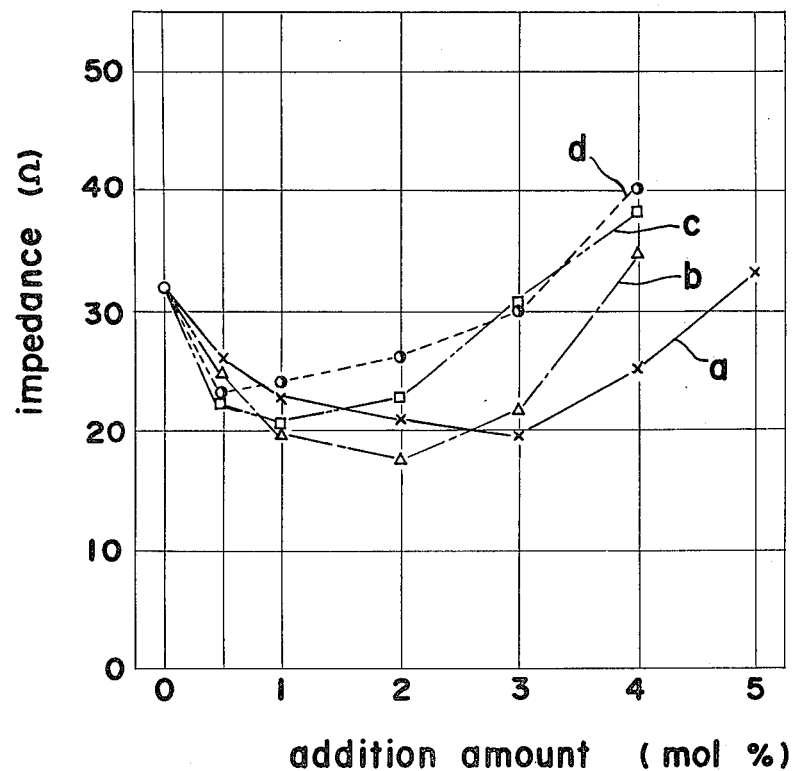
FIG. 4 is a graph showing relationships between the addition amount of the oxides to be deposited within the cell and the impedance of the cell.

FIG. 4 shows the relationship between the addition amount of an oxide with respect to manganese dioxide of the cathode to be disposed in the cell and the varied impedance of the cell being measured at the temperature of 20° C. with by loading the frequency of 1 KHz in A.C. after thirty days' preservation at the temperature of 60° C., said impedance being said as to plainly show the cell performance. Also, in FIG. 3 the reference characters a through d and point O are the same as those in FIG. 2, respectively.

It is found out from FIG. 2 that the open-circuit voltage of the cell is gradually reduced, as the above-described oxide is being added to increase, and, also, the cell swelling is decreased in accordance with the increasing of the oxide as shown in FIG. 3 for the great improvement of the cell, resulting in that the height of the swelling cell may be slightly smaller than the height of the cell height provided immediately after the manufacturing operation. It is also found out from FIG. 4 that an optimum value for the addition amount exists and depends upon the kinds of the addition agent and addition amount in accordance with the acceleration test of the cell performance for the thirty days' preservation at the temperature of 60° C.

In addition, although the open-circuit voltage of the cell of the oxide added series is reduced by approximately 60 through 240 mV as shown in FIG. 2, it is considered that this reduction is performed to cope with the acidity of the active surface adsorbent on the manganese dioxide of the cathode being reduced together with the addition amount of the oxide. The discharge voltage under the actual discharge test condition for the cells is reduced by approximately 0 through 20 mV, thus resulting in no influences upon the discharge time and the discharge capacity thereof.

According to the magnesium oxide test series in the optimum addition amount of the oxide with respect to the manganese dioxide, the cell impedance developed after the preservation for thirty days at 60° C. is smaller than the conventional one within a range up to approximately 5 mol % in the addition amount of the oxide, and the cell swelling is also reduced. Therefore, in the employment of the magnesium dioxide, the ranges of ±0.01 mm for the cell swelling and of 1 through 5 mol % for the addition amount are optimum at values according to FIG. 3 and FIG. 4, which can be called "allowable range" in the practical use.

Similarly, in the employment of the calcium oxide, approximately 4 mol % or less is optimum in terms of the impedance, while 1 through 3 mol % is optimum in terms of the cell swelling, whereby, namely, 1 through 3 mol % is optimum in all terms. Also, in the strontium oxide, up to a little over 3 mol % is optimum in terms of the impedance, 1 through 3 mol % is optimum in terms of the cell swelling, and therefore, 1 through 3 mol % is optimum in all terms. In the barium oxide, up to a little over 3 mol % is optimum in terms of the impedance, 0.5 through 3 mol % is optimum in terms of the cell swelling, and, therefore, 0.5 through 3 mol % is optimum in all terms.

Although, in the above embodiment the normal electrolytic manganese dioxide is used for the manganese dioxide, since the cell of the present invention is provided both to inactivate the acidity of the manganese dioxide, which has solid acidity, and to break the active adsorbent on the surface of the manganese dioxide to reduce the electric potential to the true potential of the manganese dioxide in order to prevent the anodic decomposition of the organic solvent used as an electrolyte within the cell, the present invention can be applied to all the manganese dioxides, which is used as an active cathode material of the lithium cell.

Also, in the above embodiment, the lithium is used for the anode, and light metals such as sodium or the like can be used in place of the lithium.

In this type of the cell using the manganese dioxide for the cathode, single ester such as propylene carbonate or the like or the mixture with the ester as a main component and low boiling-point ether such as 1,2-dimethoxyethane or the like is considered to be suitable to use as the organic solvent for constituting the electrolyte. Also, 1,3-dioxolane, tetrahydrofuran or the like can be used instead of or in addition to 1,2-dimethoxyethane as the low boiling-point ether.

The present invention is useful particularly when the electrolyte of such series as described hereinabove is used. In addition, salt which is dissolved in the organic solvent is not restricted to lithium perchlorate, but is properly selected from among salts used for this type of cells.

In the above embodiment, among the manganese dioxide active cathode materials with the alkaline earth metal oxides being added thereto and mixed therewith, manganese dioxide added 2 mol % of magnesium oxide is adapted to heat under dry air at the temperature of 400° C. for more five hours and, then, the resultant is analysed by X-ray diffraction with finding a consequence such that no solid solution is formed. Also, cells are manufactured with the cathode of manganese dioxide including the magnesium oxide, under completely the same conditions as those of the above embodiment, thus resulting in little change in the characteristics. When the manganese dioxide is heated at the temperature of 450° C. or more, the material of $\alpha$-$Mn_2O_3$ is produced, deteriorating the cell performance. According to the present invention, the surface hydroxyling group, which functions as solid acid, remaining on the surface of the manganese dioxide is reacted and inactivated by the alkaline earth metal oxide as solid base to provide the effect of the present invention. Although the temperature of 400° C. may be extreme, it is advantageous to promote the above-described reaction, using the temperature as the cathode pellets are preliminarily dried at the temperature of 80° C. before the manufacturing operation thereof.

As described hereinabove of the embodiments, according to the present invention, the preservation characteristics of the organic electrolyte cell with the manganese dioxide as the active cathode material can be improved.

Although the present invention has been described and illustrated in detail, it is to be clearly understood that the same is by way of illustration and example only and is not to be taken by way of limitation, the spirit and scope of the present invention being limited only by the terms of the appended claims.

What is claimed is:

1. A cell composed of an anode with a light metal as an active material, an organic electrolyte comprising ester, and a cathode with manganese dioxide as an active material, said cathode containing an alkaline earth metal oxide.

2. A cell in accordance with claim 1, wherein the alkaline earth metal oxide is selected from a group composed of magnesium oxide, calcium oxide, strontium oxide and barium oxide.

3. A cell in accordance with claim 2, wherein the addition amount of the magnesium oxide is 1 through 5 mol % with respect to dehydrated manganese dioxide.

4. A cell in accordance with claim 2, wherein the addition amount of the calcium oxide is 1 through 3 mol % with respect to the dehydrated manganese dioxide.

5. A cell in accordance with claim 2, wherein the addition amount of the strontium oxide is 1 through 3 mol % with respect to the dehydrated manganese dioxide.

6. A cell in accordance with claim 2, wherein the addition of the barium oxide is 0.5 through 3 mol % with respect to the dehydrated manganese dioxide.

* * * * *